United States Patent
Huelsmann

(10) Patent No.: US 9,757,842 B2
(45) Date of Patent: Sep. 12, 2017

(54) LOW PARTICULATING TOGGLE CLAMP WITH SECONDARY LOCK APPARATUS

(71) Applicant: Raytheon Company, Waltham, MA (US)

(72) Inventor: Eric P. Huelsmann, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 14/704,596

(22) Filed: May 5, 2015

(65) Prior Publication Data

US 2016/0325406 A1 Nov. 10, 2016

(51) Int. Cl.
| | |
|---|---|
| B25B 5/12 | (2006.01) |
| F16B 1/00 | (2006.01) |
| B25B 1/14 | (2006.01) |
| B25B 5/04 | (2006.01) |
| E05C 19/14 | (2006.01) |
| B25B 5/16 | (2006.01) |

(52) U.S. Cl.
CPC ............ B25B 5/12 (2013.01); B25B 1/14 (2013.01); B25B 5/04 (2013.01); B25B 5/16 (2013.01); B25B 5/166 (2013.01); E05C 19/14 (2013.01); F16B 1/00 (2013.01); *F16B 2001/0035* (2013.01)

(58) Field of Classification Search
CPC .... B25B 5/12; B25B 1/14; B25B 5/04; B25B 5/16; B25B 5/166; E05C 19/14; F16B 2001/0035
USPC .................................................. 269/228, 201
See application file for complete search history.

(56) References Cited

U.S. PATENT DOCUMENTS

| | | | | |
|---|---|---|---|---|
| 2,456,100 A | * | 12/1948 | Wood ....................... | B25B 5/12 24/457 |
| 2,835,291 A | * | 5/1958 | Blatt ........................ | B21J 15/42 24/494 |
| 2,921,486 A | * | 1/1960 | Burke ....................... | B25B 5/12 24/494 |
| 3,170,214 A | * | 2/1965 | Cochrane .................. | B25B 5/12 24/494 |
| 3,204,947 A | * | 9/1965 | Sendoykas ................ | B25B 5/12 269/228 |

(Continued)

FOREIGN PATENT DOCUMENTS

| | | | | |
|---|---|---|---|---|
| DE | 9016964 U1 | * | 4/1992 | ............... B25B 5/12 |
| DE | 19714861 C1 | * | 8/1998 | ............... B25B 5/12 |

(Continued)

*Primary Examiner* — Eret McNichols

(57) ABSTRACT

A clean toggle clamp is configured to operate without creating excessive debris. The clean toggle clamp includes a base; an arm rotationally coupled to the base via a first bearing isolated rod; a clamping element; a handle is rotationally coupled to the arm via a second bearing isolated rod. The handle includes a revolving latching pin and a linkage rotationally coupled on a first end to the handle via at least one third bearing isolated rod and on a second end to the base via a fourth bearing isolated rod. The toggle clamp includes a secondary latch rotationally coupled to the base and configured to engage the revolving latching pin to inhibit movement of the handle and arm. The handle, arm, linkage and secondary latch are configured to rotate without a frictional sliding of any of surface of the arm, the handle, the linkage or the base.

20 Claims, 11 Drawing Sheets

(56) References Cited

U.S. PATENT DOCUMENTS

| | | | | |
|---|---|---|---|---|
| 3,924,844 A * | 12/1975 | Bachtel, Jr. | ................ | B25B 5/12 269/228 |
| 4,108,589 A * | 8/1978 | Bunch | ................... | B21D 19/046 269/228 |
| 4,141,543 A * | 2/1979 | Kato | ......................... | B25B 5/12 269/228 |
| 4,257,583 A * | 3/1981 | Carson | ...................... | B25B 1/14 269/228 |
| 4,335,873 A * | 6/1982 | Kiefer | ...................... | B25B 5/163 269/228 |
| 4,422,218 A * | 12/1983 | Brasseux | .............. | B60P 7/0838 24/270 |
| 4,545,722 A * | 10/1985 | Cutkosky | ................ | B25J 15/103 294/104 |
| 5,165,148 A | 11/1992 | Fleischer et al. | | |
| 5,527,024 A * | 6/1996 | Dysktra | .................... | B25B 5/16 269/228 |
| 5,772,193 A * | 6/1998 | Dykstra | ................. | B25B 5/122 269/228 |
| 5,921,535 A * | 7/1999 | Lutz, III | ................... | B25B 5/12 269/228 |
| 5,924,685 A * | 7/1999 | Webb | ...................... | B25B 5/12 269/228 |
| 6,374,465 B1 * | 4/2002 | Dykstra | .................... | B25B 5/12 24/68 CD |
| 6,595,507 B2 | 7/2003 | Dykstra | | |
| 6,817,603 B2 * | 11/2004 | Kofod | ..................... | B25B 5/163 269/201 |
| 6,932,335 B1 * | 8/2005 | Dykstra | .................... | B25B 5/12 269/201 |
| 7,370,398 B2 * | 5/2008 | Gosis | ..................... | G12B 13/00 269/236 |
| 7,621,515 B2 * | 11/2009 | Jurcinsky | ............... | B25B 5/163 269/228 |
| 7,648,131 B2 * | 1/2010 | Hagan | ...................... | B25B 5/12 269/201 |
| 7,845,255 B2 * | 12/2010 | Heinsohn | ................. | B25B 7/08 30/175 |
| 8,123,205 B2 * | 2/2012 | Martin | ..................... | B25B 5/12 269/201 |
| 8,613,433 B2 * | 12/2013 | Poole | ....................... | B25B 5/12 269/228 |
| 8,827,255 B2 * | 9/2014 | Woods | .................... | B25B 5/163 269/120 |
| 9,010,222 B2 * | 4/2015 | Peirce | ....................... | B25B 7/10 81/319 |
| 9,163,440 B2 * | 10/2015 | Hagan | ...................... | B25B 5/08 |
| 2016/0318157 A1 * | 11/2016 | Souris | ....................... | B25B 5/12 |

FOREIGN PATENT DOCUMENTS

| | | | | |
|---|---|---|---|---|
| DE | EP 1413398 A2 * | 4/2004 | ............... | B25B 5/12 |
| DE | EP 1433571 A1 * | 6/2004 | ............... | B25B 5/12 |
| DE | 102012205203 A1 * | 10/2013 | ............. | E05C 19/14 |
| DE | 102011118538 B4 * | 3/2014 | ............... | B25B 5/12 |
| DE | 102014115432 A1 * | 4/2016 | ............... | B25G 3/16 |
| DE | 102014114295 B4 * | 5/2016 | ............... | B25B 5/04 |
| FR | 2601609 A1 * | 1/1988 | ............... | B25B 5/12 |
| FR | 2601609 B1 * | 10/1991 | ............... | B25B 5/12 |
| GB | 719634 A * | 12/1954 | ............... | B25B 5/12 |
| GB | 778865 A * | 7/1957 | ............... | B25B 5/12 |
| GB | 1128416 A * | 9/1968 | ............... | B25B 5/12 |
| TR | WO 2011099946 A2 * | 8/2011 | ............... | B25B 5/12 |

* cited by examiner

| PARTICLE SIZE | 5-15 | 15-25 | 25-50 | 50-100 | 100-150 | 150-200 | 200-400 | >400 | TOTAL |
|---|---|---|---|---|---|---|---|---|---|
| SS CLEAN CLAMP | 14 | 103 | 272 | 70 | 14 | 1 | 3 | 0 | 477 |
| 305-UR | 27041 | 8651 | 5530 | 1336 | 201 | 58 | 87 | 8 | 42912 |
| CL-200-LVTC | 172895 | 37788 | 30750 | 6319 | 931 | 240 | 313 | 6 | 249242 |
| CL-60-SPC-S | 78063 | 14824 | 7040 | 782 | 77 | 25 | 29 | 1 | 100841 |
| CL-250-LVTC | 62054 | 16802 | 7423 | 1009 | 136 | 42 | 63 | 2 | 87531 |
| CL-150-HTC-S* | 215 | 859 | 1306 | 233 | 35 | 9 | 17 | 4 | 2678 |
| 2013-UR | 34215 | 6616 | 3995 | 786 | 127 | 38 | 81 | 6 | 45864 |
| 205-SS* | 82151 | 21230 | 11899 | 2300 | 348 | 77 | 116 | 6 | 118127 |

FIG. 16B

LOW PARTICULATING TOGGLE CLAMP WITH SECONDARY LOCK APPARATUS

TECHNICAL FIELD

The present disclosure is directed clamping devices, and more particularly to a low particulating toggle clamp having a secondary lock.

BACKGROUND OF THE DISCLOSURE

A clamp is a fastening device to hold or secure objects tightly together to prevent movement or separation through the application of inward pressure. Clamps are often used in manufacturing and research environments. The clamp can be a temporary or permanent clamp. Temporary clamps include: band clamps, web clamps, bar clamps, F-clamps, sliding clamps, bench clamps, magnetic clamps, toggle clamps, and many more. Commercially available toggle clamps are commonly used in cleanroom applications where particulate contamination is a major concern. These clamps generate hundreds of thousands of small particles which lead to hardware failure and quality defects. Many also lack adequate secondary safety features.

SUMMARY OF THE DISCLOSURE

To address one or more of the above-deficiencies of the prior art, one embodiment described in this disclosure provides a low particulating toggle clamp having a secondary lock.

According to one example embodiment of the disclosure, a toggle clamp includes a base configured to couple to a surface. The toggle clamp includes an arm rotationally coupled to the base via a first bearing isolated rod. The arm includes a clamping element. A handle is rotationally coupled to the arm via a second bearing isolated rod. The handle includes a revolving latching pin and a linkage rotationally coupled on a first end to the handle via at least one third bearing isolated rod and on a second end to the base via a fourth bearing isolated rod. The toggle clamp includes a secondary latch rotationally coupled to the base and configured to engage the revolving latching pin to inhibit movement of the handle and arm. The handle, arm, linkage and secondary latch are configured to rotate without a frictional sliding of any of surface of the arm, the handle, the linkage or the base.

In another example embodiment, a toggle clamp includes a base, an arm and a handle. The arm is rotationally coupled to the base. The arm includes a clamping element. The handle is rotationally coupled to the arm. A secondary latch is configured to inhibit motion of at least one of the arm or the handle. The handle and arm are configured to rotate without a frictional sliding of any of surface of the arm, the handle or the base with another surface of the arm, the handle or the base.

In another example embodiment, a system includes a number of toggle clamps. At least one of the toggle clamps includes a base, an arm and a handle. The arm is rotationally coupled to the base. The arm includes a clamping element. The handle is rotationally coupled to the arm. A secondary latch is configured to inhibit motion of at least one of the arm or the handle. The handle and arm are configured to rotate without a frictional sliding of any of surface of the arm, the handle or the base with another surface of the arm, the handle or the base.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 16B illustrates a table showing example particulate debris from respective toggle clamps.

DETAILED DESCRIPTION

It should be understood at the outset that, although example embodiments are illustrated below, the present invention may be implemented using any number of techniques, whether currently known or not. The present invention should in no way be limited to the example implementations, drawings, and techniques illustrated below. Additionally, the drawings are not necessarily drawn to scale.

This disclosure solves a basic problem of particulate debris contamination resulting from operation of a toggle clamp within a clean room environment. Specific embodiments are shown that isolate moving members of a toggle clamp such that surfaces of the toggle clamp do not contact, slide or rub against, each other in rotational operation. Certain embodiments of the low particulate toggle clamp include a secondary lock that provides a visual confirmation that the clamp is in a clamped and secure position and will be mechanically maintained in the clamped position. Certain embodiments also minimize surface area and pockets for enhanced cleaning.

Figure 1:
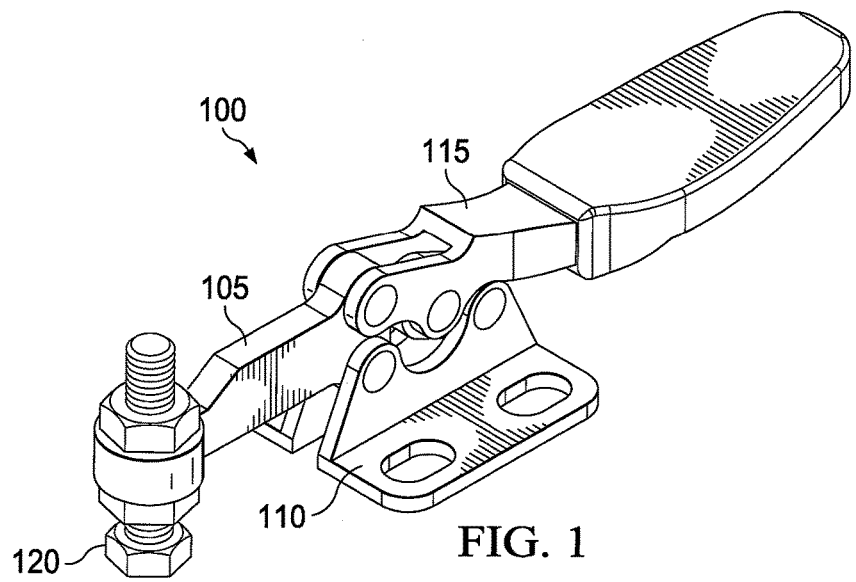
FIG. 1 illustrates an example toggle clamp.

FIG. 1 illustrates an example of a toggle clamp. The embodiment of the toggle clamp 100 shown in FIG. 1 is for illustration only. Other embodiments could be represented without departing from the scope of the present disclosure.

The toggle clamp 100 includes an arm 105 riveted to a base 110 and to a handle 115. The arm 105 includes a contact bolt 120, which can be a bolt inserted into the arm 120 such as by a threaded connection. The base 110 also is coupled to the handle 115 via a riveted joint. Since the arm 105 is coupled to the base 110 and handle 115 at rived joints, movement of the arm 105 or handle 115 relative to the other members causes a frictional sliding of the surface of the arm 105 with one or more surfaces of the handle 115 or base 110. For example, rotation of the handle 115 about the riveted joint with the arm 105 results in a frictional sliding of the surfaces of the handle 115 adjacent to a surface of the arm 105 and a frictional sliding of the surfaces of the handle 115 adjacent to a surface of the base 110. Additionally, rotational movement of the base 105 relative to the base 110 results in a frictional sliding of the surfaces of the base 110 adjacent to a surface of the arm 105. Due to the frictional sliding between the multiple surfaces of the arm 105, base 110 and handle 115, metal filings, particulates or debris separate from the members, that is from the surfaces of the arm 105, base 110 and handle 115, and are discharged or otherwise fall into the general area of the toggle clamp 100.

Figure 2:
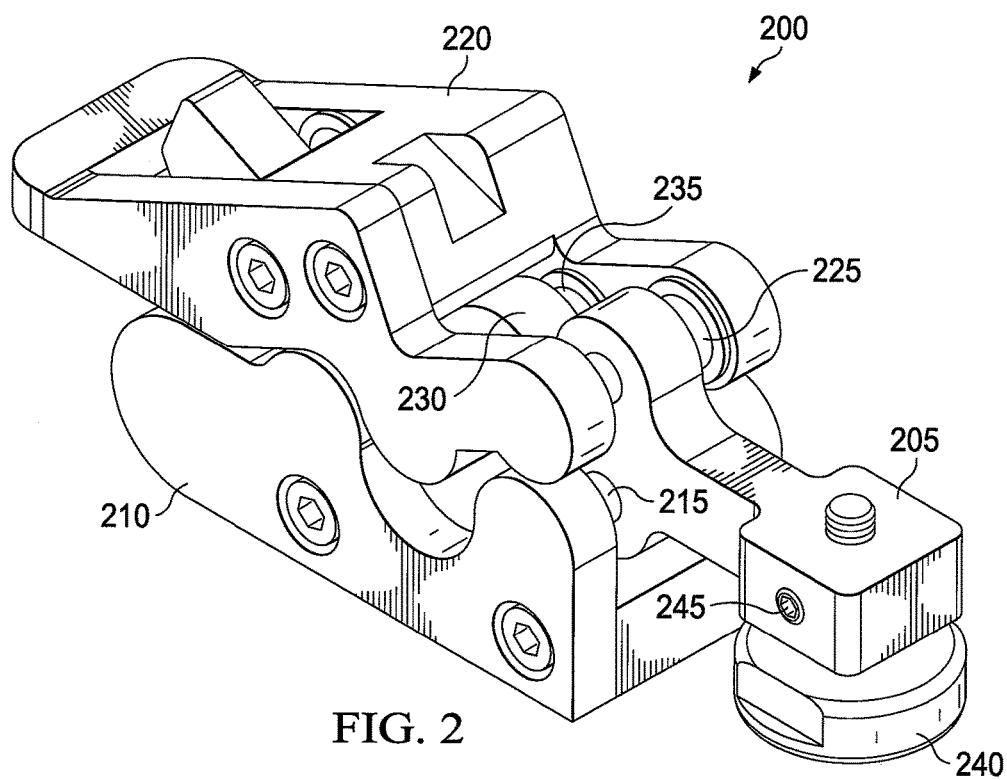
FIG. 2 illustrates a low particulating toggle clamp according to this disclosure.

FIG. 2 illustrates a low particulating toggle clamp according to this disclosure. The embodiment of the low particulating toggle clamp 200 shown in FIG. 2 is for illustration only. Other embodiments could be used without departing from the scope of the present disclosure.

The low particulating toggle clamp 200, also referred to as a clean clamp, includes a clamp arm 205 rotationally coupled to a base 210 via a first bearing isolated axle 215. The clamp arm 205 is rotationally coupled to a handle 220 via a second bearing isolated axle 225. The handle 220 is rotationally coupled to the base 210 via a linkage 230 and one or more bearing isolated axles 235. A clamping element such as a contact bolt 240 is coupled to the clamp arm 205 via one or more set screws 245 and a threaded connection. Each bearing isolated axle includes a rod member and one or more bearing joints.

The low particulating toggle clamp 200 is configured such that the rotational members, the clamp arm 205, linkage 230, base 210 and handle 220, do not contact each other when rotating. That is, since the clamp arm 205 is coupled to the base 210 and to the handle 220 via bearing isolated axles, movement of the clamp arm 205 or handle 220 relative to the other members causes no frictional sliding of the surface of the clamp arm 205 with any surfaces of the handle 220, the linkage 230 or base 210. Each of the clamp arm 205, base 210, handle 220 and linkage 230 are dimensioned such that rotation results in no sliding surfaces between two adjacent members. That is, instead of each member sliding against each other as the members rotate about pivot joints created by rivets, as in the toggle clamp 100, each member, namely the clamp arm 205, base 210, linkage 230 and handle 220, rotates via a rolling motion of the bearings in each bearing isolated axle. For example, rotation of the handle 220 about the bearing isolated axle with the clamp arm 205 results in no frictional sliding of any of the surfaces of the handle 220, the arm 205, the linkage 230 or the base 210. As a result of rotation via bearings, each member easily and freely rotates about the respective bearing isolated axles providing ease of use and increased longevity of functional use of the low particulating toggle clamp 200. That is, the bearings enable each of the members to be rotationally coupled with no sliding motion. In addition, the rotation via bearings increases cycle life, such as a fatigue life of at least 1,000,000 cycles under full load, of the low particulating toggle clamp 200.

Figure 3A:
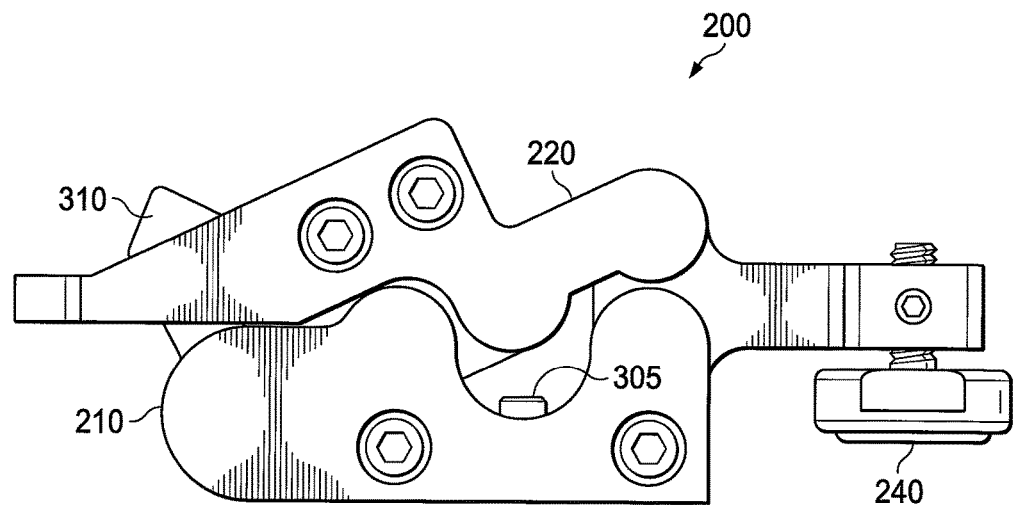
FIGS. 3A and 3B illustrate lateral views of the low particulating toggle clamp according to this disclosure.
Figure 3B:
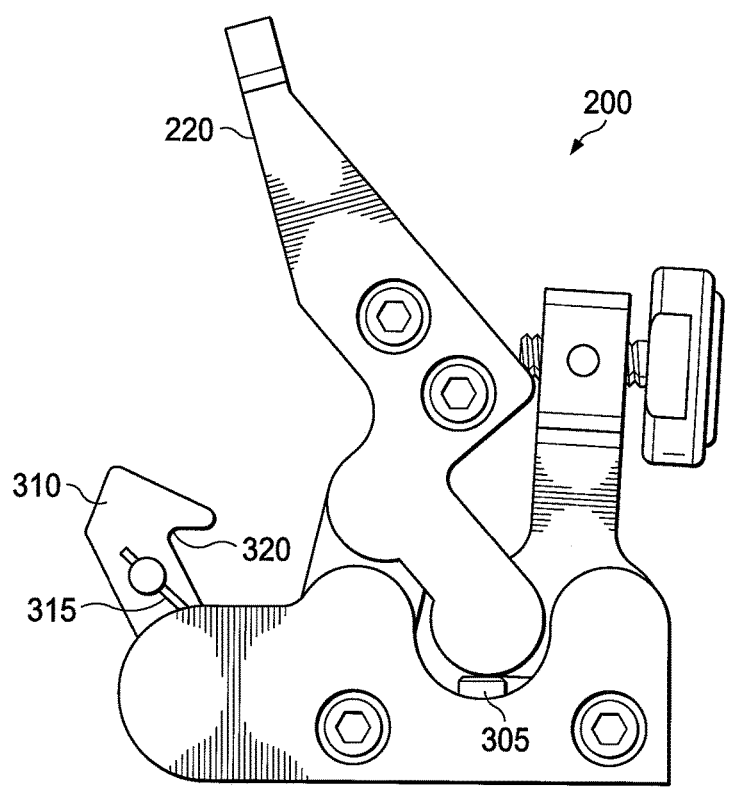

FIGS. 3A and 3B illustrate a lateral view of the low particulating toggle clamp according to this disclosure. In the example shown in FIG. 3A, the low particulating toggle clamp 200 is in a closed, that is clamped, position. In the example shown in FIG. 3B, the low particulating toggle clamp 200 is in an open, that is un-clamped, position In certain embodiments, the low particulating toggle clamp 200 includes a magnetic element 305 that maintains the low particulating toggle clamp 200 in an open position. The magnetic element 305 is positioned to magnetically couple the handle 220 to the base 210. When in an open position, the handle 220 contacts the magnetic element 305. The magnetic element 305 restrains free movement, such as return motion, of the handle 220, which enables hands-free loading of the low particulating toggle clamp 200.

The low particulating toggle clamp 200 also includes a secondary latch 310 that provides a visual and mechanical confirmation that the low particulating toggle clamp 200 is in a clamped position and will remain in the clamped position. The secondary latch 310 is rotatably coupled to the base 210 via a bearing isolated axle and a spring 315. The secondary latch 310 is spring loaded to cause the secondary latch 310 to remain in a forward, i.e., closed, position unless an external force acts thereupon. The secondary latch 310 is configured to engage a revolving latching pin included in the handle 220 when the low particulating toggle clamp 200 is in the closed position. When closing or opening the low particulating toggle clamp 200, the revolving latching pin rotates as the secondary latch 310 engages or disengages the revolving latch pin; thus, no sliding of surfaces between the secondary latch 310 and the revolving latch pin occurs.

The low particulating toggle clamp 200 is configured to maintain in a clamped position. That is, due to the leverage angles employed between the handle 220, clamp arm 205, linkage 230 and base 210, when a force is applied by the contact bolt 240, an equal and opposite force applied to the contact bolt 240 by the clamping action causes the low particulating toggle clamp 200 to remain in the clamped position unless and until an external force operates on one or more of the members, i.e., the handle 220, clamp arm 205, linkage 230 and base 210. Engagement of the secondary latch 310 with the revolving latch pin prevents the handle 210 from moving, which also prevents the other members from moving and prevents the low particulating toggle clamp 200 from opening. Therefore, the engagement of the secondary latch 310 with the revolving latch pin maintains the low particulating toggle clamp 200 in the clamped position. Since engagement of the secondary latch 310 with the revolving latch pin is mechanically and visually apparent, that is since an operator can visually verify that the secondary latch 310 is engaged with the revolving latch pin, the secondary latch 310 not only provides a second locking function but also provides a visual indication that the low particulating toggle clamp 200 is, and will mechanically remain, in the clamped position.

In order to transition the low particulating toggle clamp 200 from the un-clamped position to the clamped position, an operator draws moves the handle 220 backward causing the contact bolt 240 to physically engage an object to be clamped. The operator can allow the secondary latch 310 to be pushed back by the revolving latch pin, which rotates accordingly, and then engage the secondary latch 310 as the revolving latch pin approaches a notch 320 in the secondary latch 310. The operator also can physically pull back the secondary latch 310 until the handle 220 is drawn back and release the secondary latch 310 to engage the revolving latch pin. In order to transition the low particulating toggle clamp 200 from the clamped position to the un-clamped position, an operator draws the secondary latch 310 back away from the revolving latch pin, which rotates accordingly. Then, the operator moves the handle 220 forward causing the contact bolt 240 to disengage from a clamped object.

Figures 4, 5:
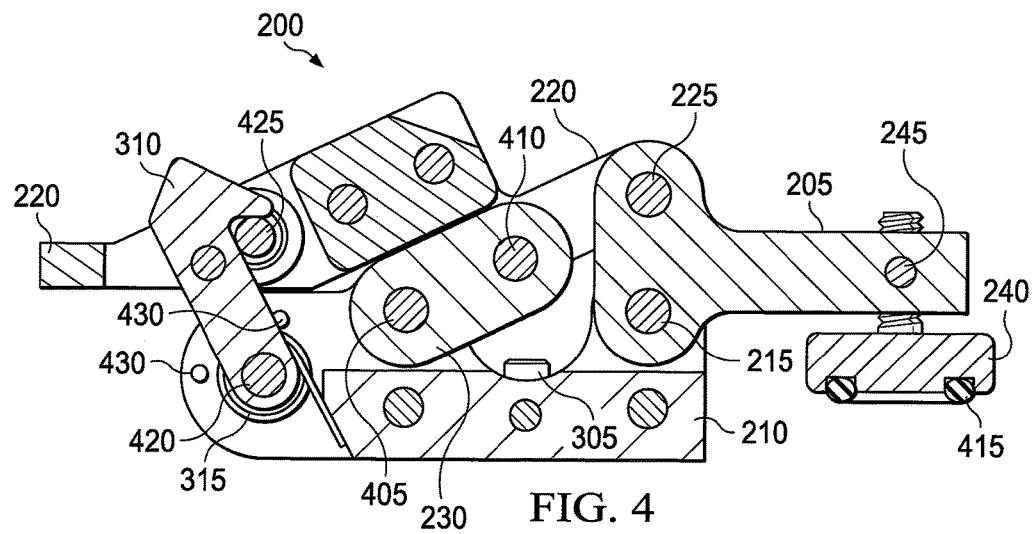
FIG. 4 illustrates a cross-section view of the low particulating toggle clamp according to this disclosure.
FIG. 5 illustrates a top plan view of the low particulating toggle clamp according to this disclosure.

FIG. 4 illustrates a cross-section view of the low particulating toggle clamp according to this disclosure. FIG. 5 illustrates a top plan view of the low particulating toggle clamp according to this disclosure. In the examples shown in FIGS. 4 and 5, the low particulating toggle clamp 200 is in a closed, that is clamped, position.

In certain embodiments, the low particulating toggle clamp 200 includes the clamp arm 205 rotationally coupled to the base 210 via a first bearing isolated axle 215. The clamp arm 205 is rotationally coupled to the handle 220 via a second bearing isolated axle 225. As shown in the example shown in FIG. 5, the handle 220 includes a first part 220a and a second part 220b. The linkage 230 is rotationally coupled to the base 210 via a third bearing isolated axle 405. The handle 220 is rotationally coupled to the linkage 230 via one or more bearing isolated axles 410. Each bearing isolated axle includes a rod member and one or more bearing joints. The contact bolt 240 is coupled to the clamp arm 205 via one or more set screws 245 and a threaded connection. The contact bolt 240 includes a captive o-ring 415. The low particulating toggle clamp 200 also includes the magnetic element 305 that can maintain the low particulating toggle clamp 200 in an un-clamped position and the secondary latch 310 that provides a visual and mechanical confirmation that the low particulating toggle clamp 200 is in a clamped position and will remain in the clamped position. The secondary latch 310 is rotatably coupled to the base 210 via a bearing isolated axle 420 and spring 315. The secondary latch 310 is restrained from full circular motion by one or more stop pins 430 configured to limit the secondary latch to rotate with a limited arc. The secondary latch 310 is configured to engage the revolving latching pin 425, which is included in the handle 220. The revolving latching pin 425 is rotatably coupled, such as through respective bearing interfaces, to the handle 220 between the first part 220a and the second part 220b.

Figure 6A:
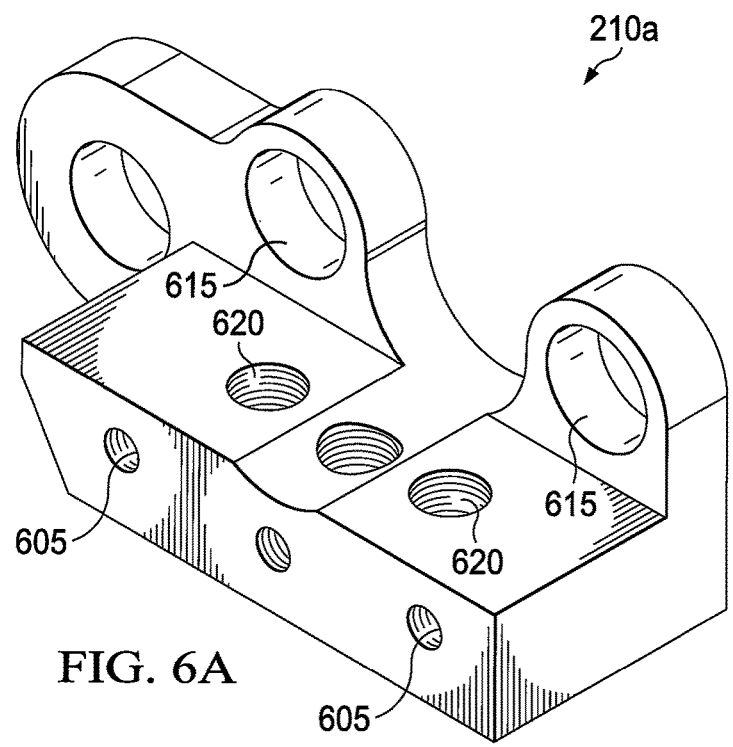
FIGS. 6A and 6B illustrate a base of the low particulating toggle clamp according to this disclosure.
Figure 6B:
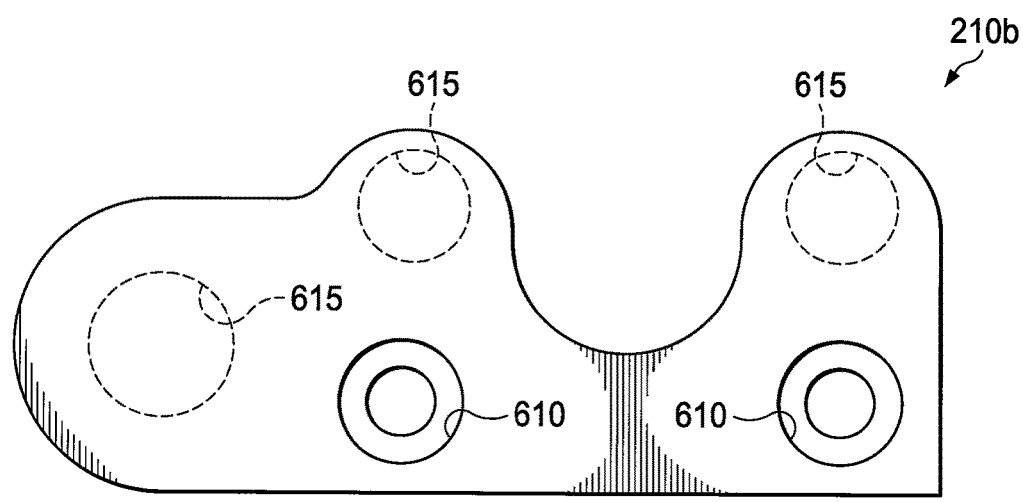

FIGS. 6A and 6B illustrate a base of the low particulating toggle clamp according to this disclosure. FIG. 6A illustrates a first part 210a of the base 210 and FIG. 6B illustrates a second part 210b of the base 210. Although the examples in FIGS. 6A and 6B illustrate the base 210 comprised of two parts, the base 210 could include more or less parts.

In certain embodiments, the low particulating toggle clamp 200 includes a two-part base. The first part 210a of the base 210 is configured to couple to the second part 210b at one or more joints. For example, the first part 210a can include a first set of recesses 605 that align with a corresponding set of vias 610 on the second part 210b. The first set of recesses 605 can include a treading or socket assembly configured to receive and hold a screw or bolt that is inserted through vias 610.

Each of the first part 210a and second part 210b include recesses 615. The recesses 615 are configured to receive the bearing isolated axles. That is, each recess can be dimensioned to receive either a bearing pack or be coupled to the axle.

The base 210, such as the first part 210a, includes a number of vias 620. The vias are configured to enable the low particulating toggle clamp 200 to be secured to a surface of another object.

Figure 7:
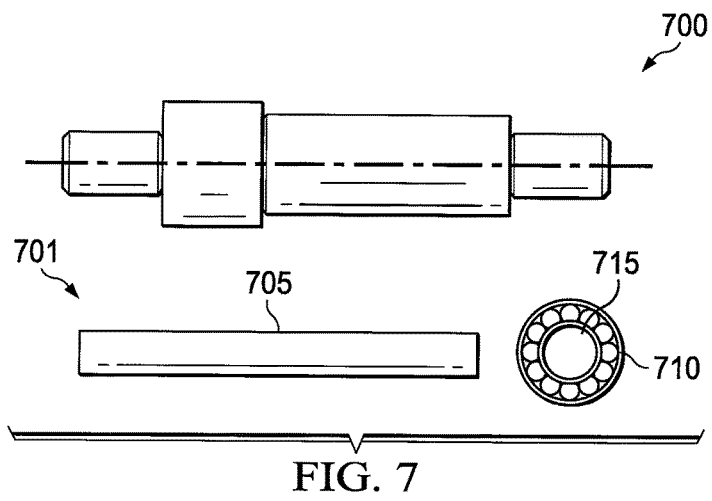
FIG. 7 illustrates a bearing isolated axle having at least one axle and one or more bearings according to this disclosure.

FIG. 7 illustrates a bearing isolated axle according to this disclosure. The embodiment of the bearing isolated axle 700 shown in FIG. 7 is for illustration only. Other embodiments could be used without departing from the scope of the present disclosure. In the example shown in FIG. 7, a bearing isolated axle 700 and its component parts 701 are illustrated by example. One or more of the bearing isolated axles in FIGS. 1-6, such as bearing isolated axles 215, 225, 405, 410, can be configured the same as, or similar to, bearing isolated axle 700. Herein, the bearing isolated axle 700 is also referred to as a bearing isolated rod. Additionally, although referred to as a bearing, the term "bearing pack" may also be used.

The bearing isolated axle 700 includes a rod 705 coupled to one or more bearings 710. For example, a bearing 710 can be inserted into a recess, such as recess 615, or vias, in the base 210, handle 215, clamp arm 205 and linkage 230. The rod 705 can be inserted through the via 715 in the bearing 710 or otherwise be couple to the bearing 710. This enables the rod 705 to rotate freely in 360°, which further enables rotation of the members, namely the base 210, handle 215, clamp arm 205 and linkage 230, with respect to each other.

Figure 8:
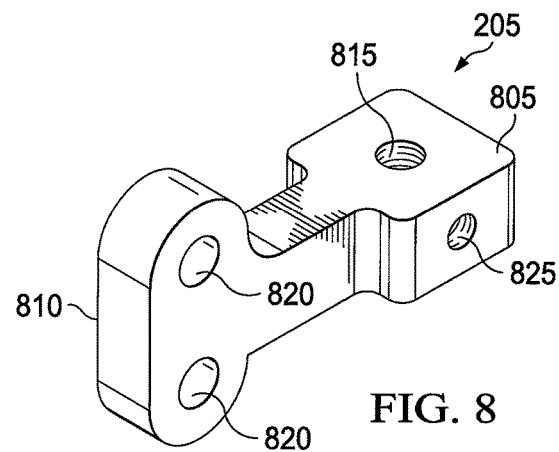
FIG. 8 illustrates a clamp arm of the low particulating toggle clamp according to this disclosure.

FIG. 8 illustrates a clamp arm of the low particulating toggle clamp according to this disclosure. The embodiment of the linkage member 205 shown in FIG. 8 is for illustration only. Other embodiments could be used without departing from the scope of the present disclosure.

The clamp arm 205 includes a first planar portion 805 oriented perpendicular to a second planar portion 810. The first planar portion 805 includes a first via 815 dimensioned to receive a portion of the contact bolt 240 and a second via 825 configured to hold a set screw. The set screw is operable to, when inserted in to second via 825, apply a force to the contact bolt 240 sufficient to restrain movement the contact bolt 240 during a clamping operation. The second planar portion 810 includes vias or recesses 820 configured to couple to a bearing isolated axle 700. For example, the second planar portion 810 can include vias dimensioned to be coupled with a bearing 710 and have an axle 705 inserted therethrough. Alternatively, the second planar portion 810 can include recesses dimensioned to be coupled with a first bearing 710 and axle 705 on a first side and second bearing 710 and axle 705 on a second side, such that each rotation point includes at least two bearing isolated axles 700.

Figure 9:
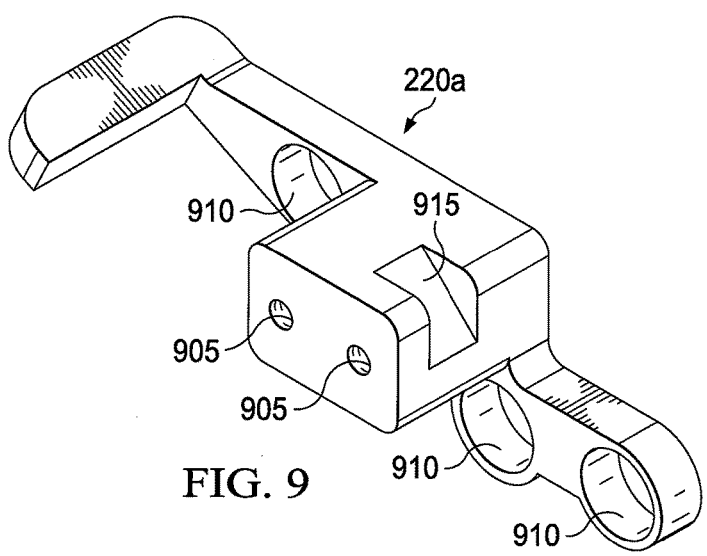
FIG. 9 illustrates a portion of a handle member of the low particulating toggle clamp according to this disclosure.

FIG. 9 illustrates a portion of a handle member of the low particulating toggle clamp according to this disclosure. The embodiment of the portion of the handle 220a shown in FIG.

9 is for illustration only. Other embodiments could be used without departing from the scope of the present disclosure.

In certain embodiments, the low particulating toggle clamp 200 includes a two-part handle. The portion of the handle 220a includes a first set of recesses 905 that align with a corresponding set of vias on a second portion of the handle 220. The first set of recesses 905 can include a threading or socket assembly configured to receive and hold a screw or bolt that is inserted through vias on the second portion of the handle 220.

Each of the portions of the handle 220 includes recesses 910. The recesses 910 are configured to receive the bearing isolated axles. That is, each recess can be dimensioned to receive either a bearing pack or be coupled to the axle.

The handle 220 also includes a notch 915. The notch 915 is positioned and dimensioned to accommodate retraction of the clamp arm 205 against the handle 220. That is, as the low particulating toggle clamp 200 is opened, the clamp arm 205 can be drawn towards each other. To allow for a full range retraction of the contact bolt 240, the notch 915 provides an area for the clamp arm 205 to not impact the handle 220.

Figure 10A:
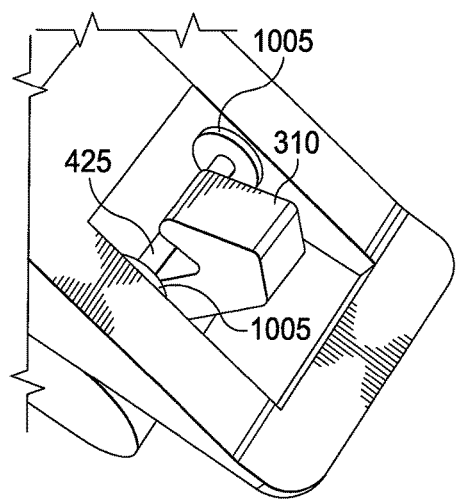
FIG. 10A illustrates a secondary latch of the low particulating toggle clamp according to this disclosure.
Figure 10B:
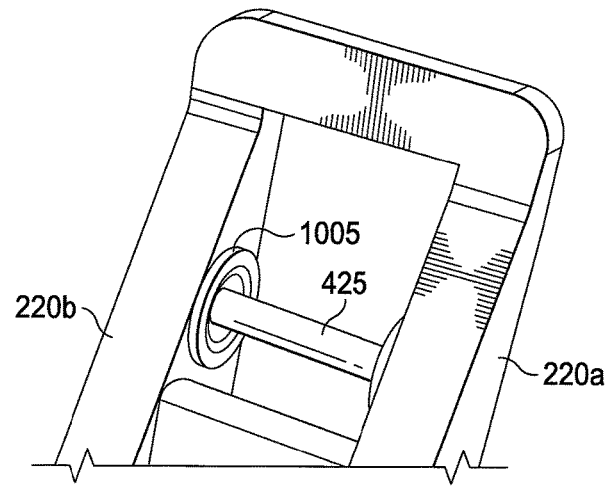
FIG. 10B illustrates a revolving latch pin of the low particulating toggle clamp according to this disclosure

FIGS. 10A and 10B illustrate the secondary lock of the low particulating toggle clamp according to this disclosure. The embodiments of the secondary lock 310 shown in FIG. 10A and the revolving latching pin 425 shown in FIG. 10B are for illustration only. Other embodiments could be used without departing from the scope of the present disclosure.

In certain embodiments, the low particulating toggle clamp 200 also includes a secondary latch 310 that provides a visual and mechanical confirmation that the low particulating toggle clamp 200 is in a clamped position and will remain in the clamped position. The secondary latch 310 is rotatably coupled to the base 210 via a bearing isolated axle and a spring 315. The secondary latch 310 is spring loaded to cause the secondary latch 310 to remain in a forward, i.e., closed, position unless an external force acts thereupon. The secondary latch 310 is configured to engage the revolving latching pin 425 included in the handle 220 when the low particulating toggle clamp 200 is in the closed position. The revolving latching pin 425 is rotatably coupled, such as through respective bearing interfaces 1005, to the handle 220 between the first part 220a and the second part 220b. When closing or opening the low particulating toggle clamp 200, the revolving latching pin 425 rotates as the secondary latch 310 engages or disengages the revolving latch pin 425; thus, no sliding of surfaces between the secondary latch 310 and the revolving latch pin 425 occurs.

Figure 11:
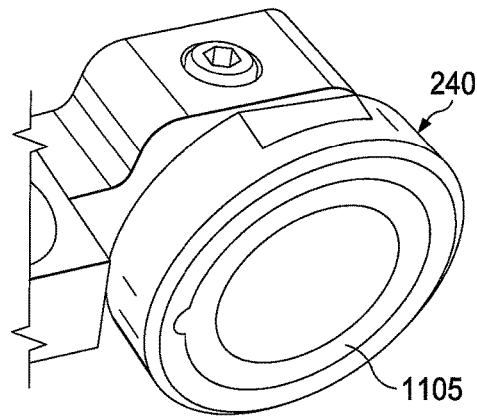
FIG. 11 illustrates a contact bolt having a captive o-ring according to this disclosure.

FIG. 11 illustrates a contact bolt having a captive o-ring according to this disclosure. The embodiment of the contact bolt 240 having a captive o-ring 1105 shown in FIG. 11 is for illustration only. Other embodiments could be used without departing from the scope of the present disclosure.

In certain embodiments, the contact bolt 240 includes a captive o-ring 1105. As shown in FIG. 11, the contact bolt 240 includes the captive o-ring 1105. The captive o-ring 1105 can be comprised of one or many different materials such as Polytetrafluoroethylene (PTFE), such as TEFLON®, Nitrile (Buna-N), Neoprene, ethylene propylene diene monomer (EPDM) Rubber and Fluorocarbon (Viton), KAL-REZ® o-rings or Silicone seals. The contact bolt 240 includes a captive groove for easy o-ring replacement. The o-ring 1105 minimizes surface area and pockets for enhanced cleanability of the contact bolt 240. The o-ring 1105 also softens, reduces or eliminates hard contact between the contact bolt 240 and the object being clamped.

Figure 12:
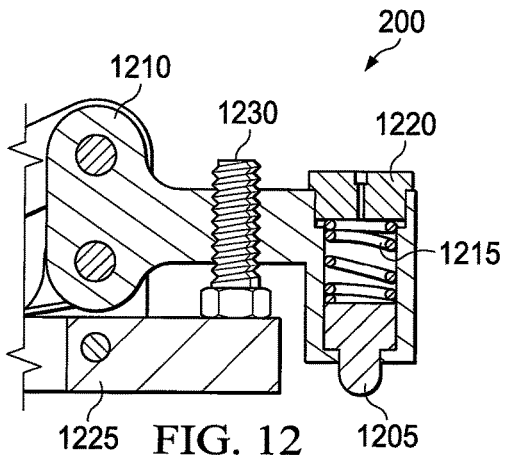
FIG. 12 illustrates a low particulating toggle clamp having a hardstop and spring-loaded tip according to this disclosure.

FIG. 12 illustrates a low particulating toggle clamp having a hardstop and spring-loaded tip according to this disclosure. The embodiment of the low particulating toggle clamp 200 shown in FIG. 12 is for illustration only. Other embodiments could be used without departing from the scope of the present disclosure.

In certain embodiments, the low particulating toggle clamp 200 includes a clamping element comprised of a spring-loaded tip 1205 instead of the contact bolt 240. The spring loaded tip 1205 is disposed within a recess and via of the clamp arm 1210. A spring 1215 is secured against the spring loaded tip 1205 by a restraining cap 1220. The spring 1215 and spring loaded tip 1205 are removable by unlocking or unscrewing of the restraining cap 1220. The spring 1215 and spring loaded tip 1205 can be replaced for different purposes that may require a different material for the spring loaded tip 1205 or a different K-constant for the spring 1215.

In certain embodiments, a hard stop is provided by an extended base 1225 and hard stop bolt 1230, which is threaded through a via in the clamp arm 1210. As the clamp arm 1210 is drawn forward into the clamped position, the stop bolt 1230 contacts the extended base 1225 and ceases forward motion of the clamp arm 1210. As such, the hard stop limits a forward clamping motion of the low particulating toggle clamp 200, which may be necessary to prevent damage to the object being clamped.

Figure 13A:
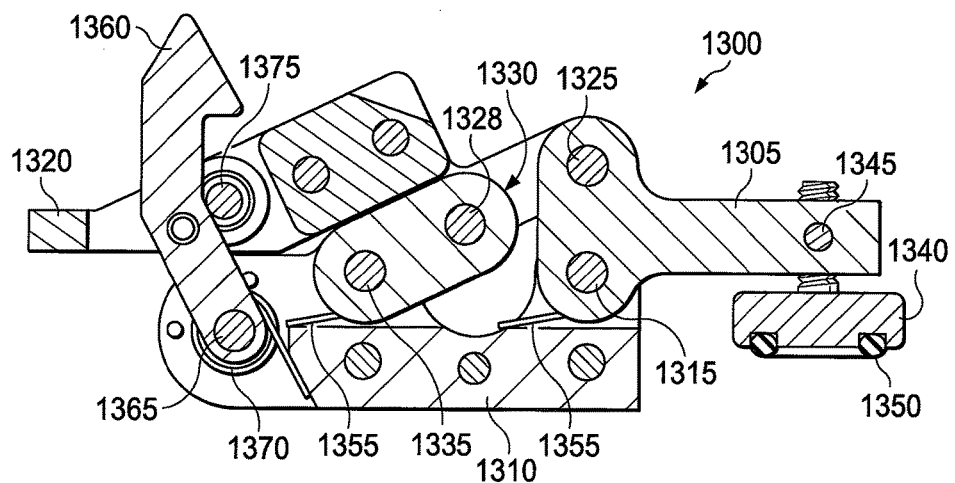
FIG. 13A illustrates a cross-section view of a normally closed low particulating toggle clamp according to this disclosure.
Figure 13B:
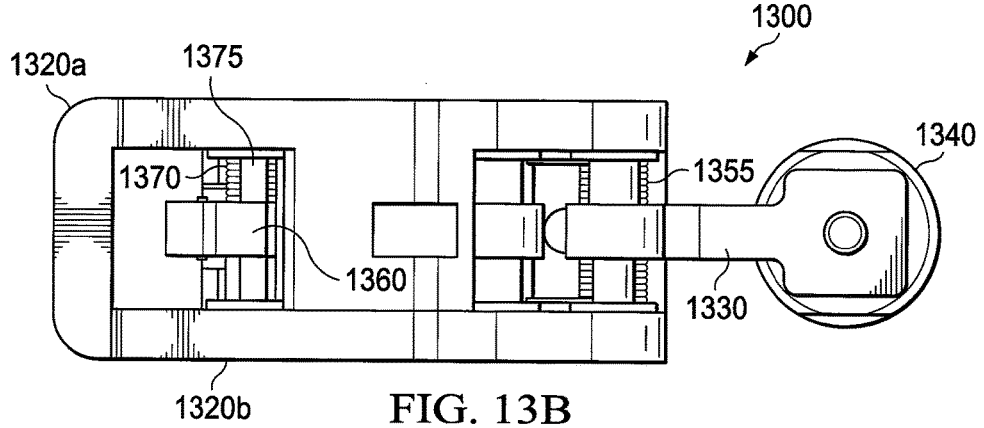
FIG. 13B illustrates a top plan view of a normally closed low particulating toggle clamp according to this disclosure.

FIGS. 13A and 13B illustrate a normally closed low particulating toggle clamp according to this disclosure. The embodiment of the normally closed low particulating toggle clamp 1300 shown in FIG. 13 is for illustration only. Other embodiments could be used without departing from the scope of the present disclosure.

In certain embodiments, the low particulating toggle clamp is a normally closed low particulating toggle clamp 1300. The normally closed low particulating toggle clamp 1300 is configured to maintain a restraining force on the clamped object when in a neutral position. An operator applies a force to the handle to open the normally closed low particulating toggle clamp 1300 and release the clamped object, or insert an object to be clamped. Upon removal of force to the handle, the normally closed low particulating toggle clamp 1300 returns to the neutral, restrained, position, engages the secondary lock, and resumes restraining of the object being clamped (engages safety). Application of another, such as downward, force on the handle causes the normally closed low particulating toggle clamp 1300 returns to the closed, clamped, position in which a clamping force is applied to the clamped object.

The normally closed low particulating toggle clamp 1300 includes the clamp arm 1305 rotationally coupled to the base 1310 via a first bearing isolated axle 1315. The clamp arm 1305 is rotationally coupled to the handle 1320 via a second bearing isolated axle 1325. As shown in the example shown in FIG. 13B, in certain embodiments, the handle 1320 includes a first part 1320a and a second part 1320b. A linkage 1330 is rotationally coupled to the base 1310 via a third bearing isolated axle 1335. The handle 1320 is rotationally coupled to the linkage 1330 and one or more bearing isolated axles 1328. Each bearing isolated axle includes a rod member and one or more bearing joints. A clamping element such as contact bolt 1340 is coupled to the clamp arm 1305 via one or more restraining bolts 1345 and a threaded connection. The contact bolt 1340 includes a captive o-ring 1350. The low particulating toggle clamp 1300 also includes springs 1355 that maintain the low particulating toggle clamp 1300 in a clamped position and a secondary latch 1360 that provides a visual and mechanical confirmation that the low particulating toggle clamp 1300 is in a clamped position and will remain in the clamped position. That is, the secondary latch 1360 ensures that, in the event of a failure of an element, such as one or more of the springs 1355. The secondary latch 1360 is rotatably coupled to the base 1310 via a bearing isolated axle 1365 and spring 1370. The secondary latch 1360 is configured to engage the revolving latching pin 1375, which is included in the handle 1320. The revolving latching pin 1375 is rotatably coupled, such as through respective bearing interfaces, to the handle 1320 between the first part 1320a and the second part 1320b.

Figure 14A:
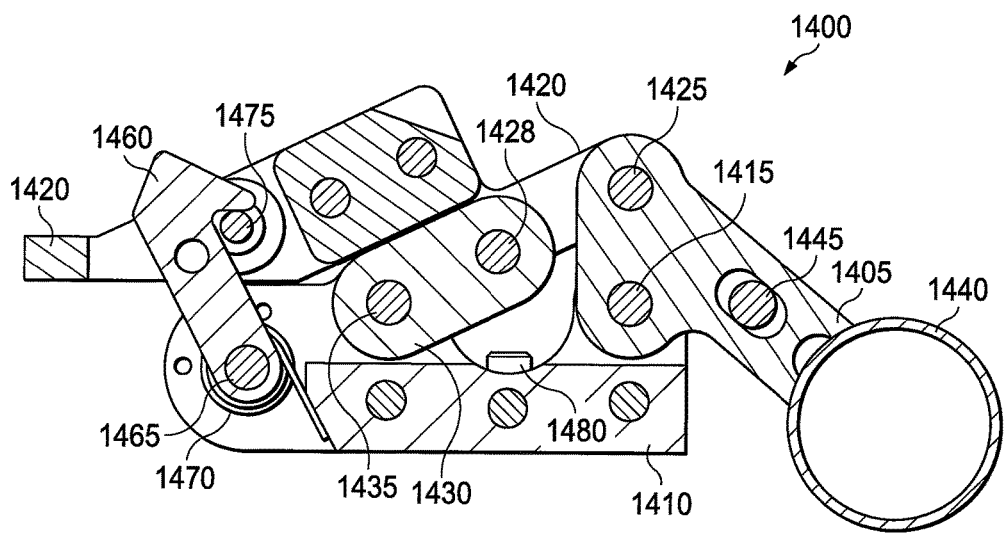
FIG. 14A illustrates a cross-section view of a rotation brake low particulating toggle clamp according to this disclosure.
Figure 14B:
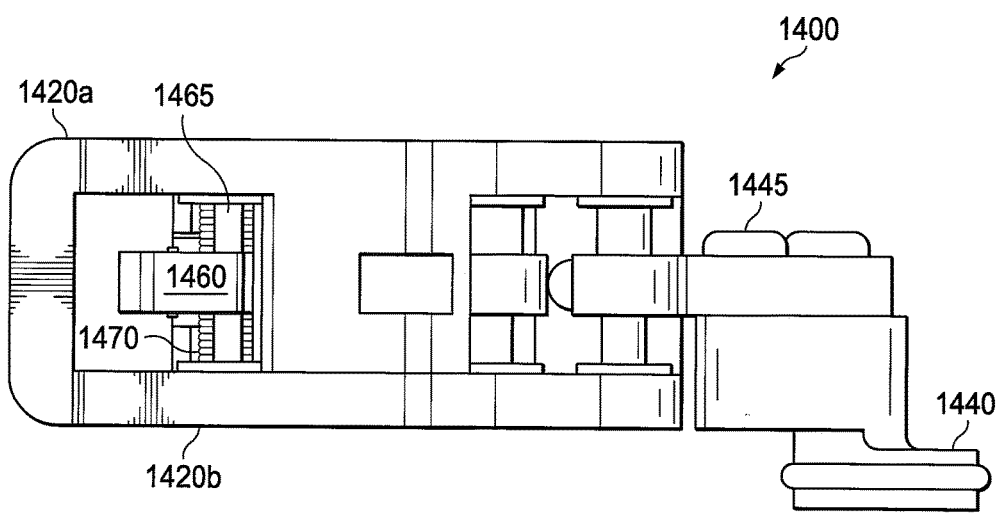
FIG. 14B illustrates a top plan view of a rotation brake low particulating toggle clamp according to this disclosure.

FIGS. 14A and 14B illustrate a rotation brake low particulating toggle clamp according to this disclosure. The embodiment of the rotation brake low particulating toggle clamp 1400 shown in FIGS. 14A and 14B is for illustration only. Other embodiments could be used without departing from the scope of the present disclosure.

In certain embodiments, the low particulating toggle clamp is configured as a rotation brake low particulating toggle clamp 1400. The rotation brake low particulating toggle clamp 1400 is configured to apply a clamping force to a rotating object. An operator applies a force to the handle to engage the rotation brake low particulating toggle clamp 1400 with a rotating object. The operator applies another force to the handle to dis-engage the rotation brake low particulating toggle clamp 1400 from the rotating object.

The rotation brake low particulating toggle clamp 1400 includes the clamp arm 1405 rotationally coupled to the base 1410 via a first bearing isolated axle 1415. The clamp arm 1405 is rotationally coupled to the handle 1420 via a second bearing isolated axle 1425. As shown in the example shown in FIG. 14B, in certain embodiments, the handle 1420 includes a first part 1420a and a second part 1420b. A linkage 1430 is rotationally coupled to the base 1410 via a third bearing isolated axle 1435. The handle 1420 is rotationally coupled to the linkage 1430 via one or more bearing isolated axles 1428. Each bearing isolated axle includes a rod member and one or more bearing joints. A clamping element such as a contact disc 1440 is coupled to the clamp arm 1405 via one or more restraining bolts 1445. The contact disc 1440 includes a circular ring stop disc dimensioned to align with one or more circular recesses in a rotating object to be clamped. In certain embodiments, the contact disc 1440 is removable and replaceable with discs of different dimensions. The rotation brake low particulating toggle clamp 1400 also includes a secondary latch 1460 that provides a visual and mechanical confirmation that the rotation brake low particulating toggle clamp 1400 is in a clamped position and will remain in the clamped position. The secondary latch 1460 is rotatably coupled to the base 1410 via a bearing isolated axle 1465 and spring 1470. The secondary latch 1460 is configured to engage the revolving latching pin 1475, which is included in the handle 1420. The revolving latching pin 1475 is rotatably coupled, such as through respective bearing interfaces, to the handle 1420 between the first part 1420a and the second part 1420b. The rotation brake low particulating toggle clamp 1400 also includes a magnetic element 1480 that can maintain the rotation brake low particulating toggle clamp 1400 in an un-clamped position.

Figure 15A:
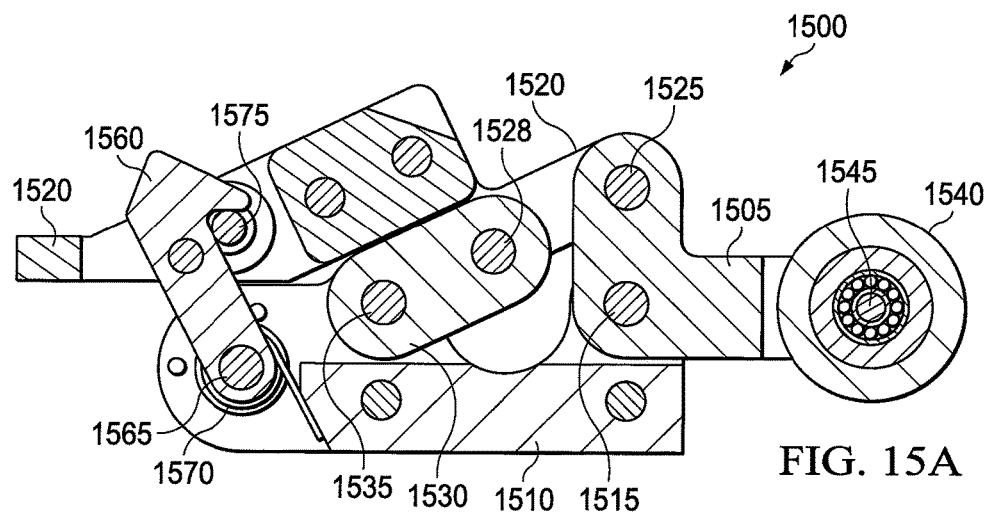
FIG. 15A illustrates a cross-section view of a low particulating toggle clamp having a clamp roller according to this disclosure.
Figure 15B:
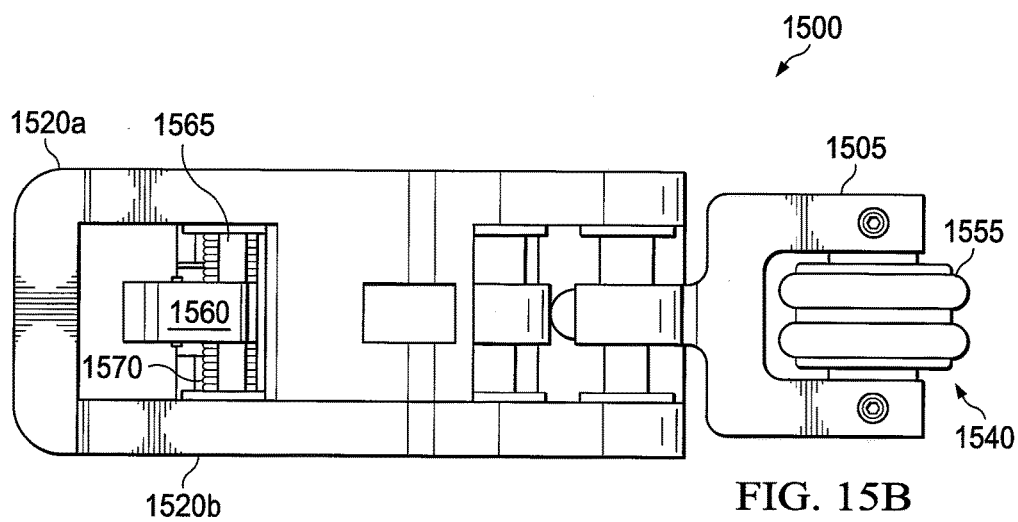
FIG. 15B illustrates a top plan view of a low particulating toggle clamp having a clamp roller according to this disclosure.

FIGS. 15A and 15B illustrate a low particulating toggle clamp having a clamp roller according to this disclosure. The embodiment of the low particulating toggle clamp 1500 having a clamp roller shown in FIGS. 15A and 15B is for illustration only. Other embodiments could be used without departing from the scope of the present disclosure.

In certain embodiments, the low particulating toggle clamp 1500 includes a clamp roller. The low particulating toggle clamp 1500 includes the clamp arm 1505 rotationally coupled to the base 1510 via a first bearing isolated axle 1515. The clamp arm 1505 is rotationally coupled to the handle 1520 via a second bearing isolated axle 1525. As shown in the example shown in FIG. 15B, in certain embodiments, the handle 1520 includes a first part 1520a and a second part 1520b. A linkage 1530 is rotationally coupled to the base 1510 via a third bearing isolated axle 1535. The handle 1520 is rotationally coupled to the linkage 1530 via one or more bearing isolated axles 1528. Each bearing isolated axle includes a rod member and one or more bearing joints. A clamping element such as clamp roller 1540 is coupled to the clamp arm 1505 via a restraining bolt or bearing isolated axle 1545. In certain embodiments, the clamp roller 1540 is removable and replaceable with discs of different dimensions. The low particulating toggle clamp 1500 also includes a secondary latch 1560 that provides a visual and mechanical confirmation that the low particulating toggle clamp 1500 is in a clamped position and will remain in the clamped position. The secondary latch 1560 is rotatably coupled to the base 1510 via a bearing isolated axle 1565 and spring 1570. The secondary latch 1560 is configured to engage the revolving latching pin 1575, which is included in the handle 1520. The revolving latching pin 1575 is rotatably coupled, such as through respective bearing interfaces, to the handle 1520 between the first part 1520a and the second part 1520b. In certain embodiments, low particulating toggle clamp 1500 also includes a magnetic element that can maintain the low particulating toggle clamp 1500 in an un-clamped position.

In certain embodiments, the clamp roller 1540 includes two circular discs, each comprising a protective o-ring 1555. In certain embodiments, the clamp roller 1540 includes a single circular disc. The protective o-ring 1555 can be comprised of one or many different materials such as Polytetrafluoroethylene (PTFE), such as TEFLON®, Nitrile (Buna-N), Neoprene, ethylene propylene diene monomer (EPDM) Rubber and Fluorocarbon (Viton), KALREZ® o-rings or Silicone seals. The clamp roller 1540 includes a captive groove for easy o-ring replacement. The protective o-ring 1555 minimizes surface area and pockets for enhanced cleanability of the contact bolt 240. The protective o-ring 1555 also softens, reduces or eliminates hard contact between the contact bolt 240 and the object being clamped.

Figure 16A:
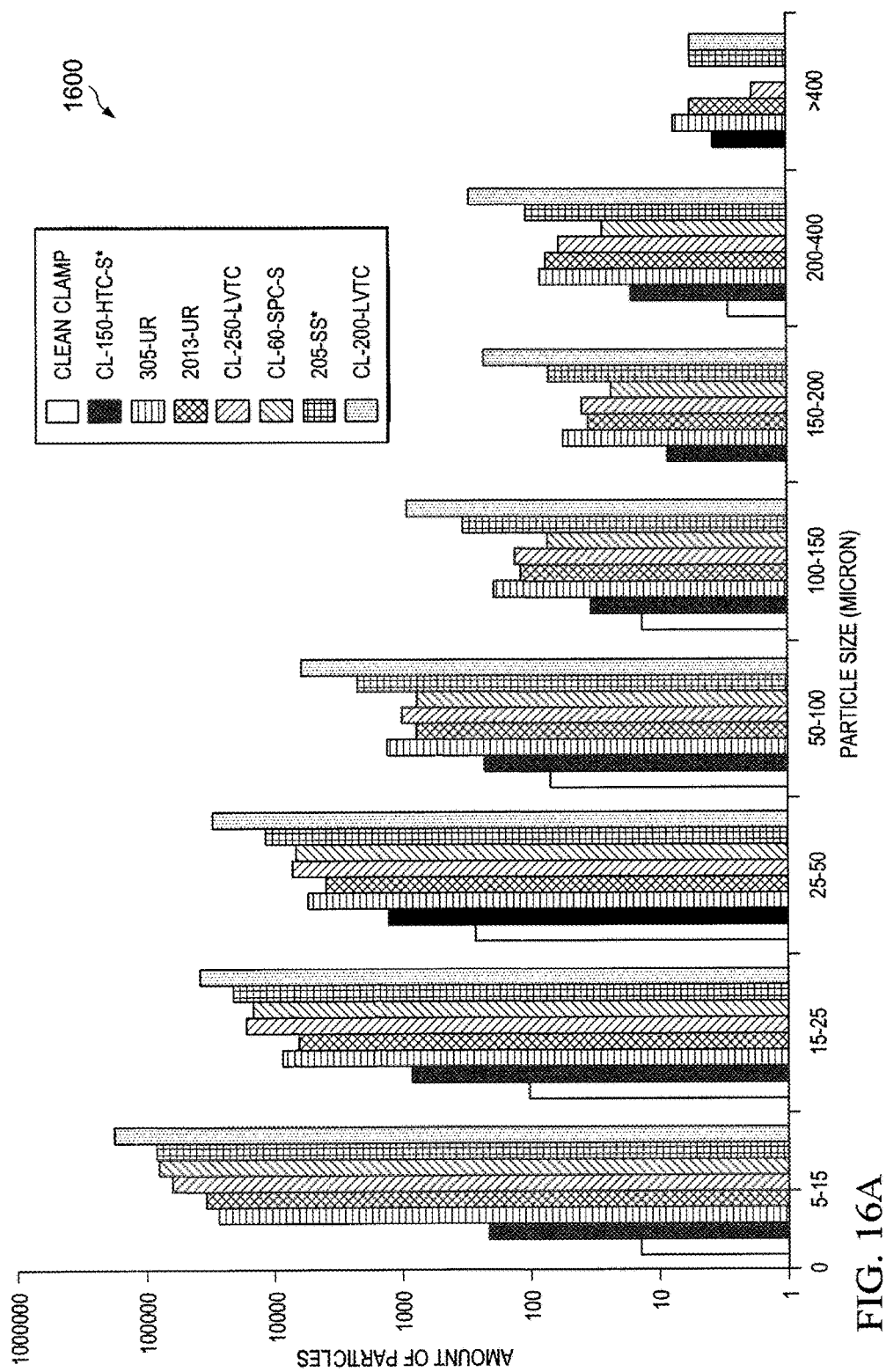
FIG. 16A illustrates a graph showing example particulate debris from respective toggle clamps.

FIG. 16 illustrates a graph showing example particulate debris from respective toggle clamps. The data of the graph shown in FIG. 16 is by example only. Other example data sets could be represented and embodiments of the present disclosure are not limited to the particular data set illustrated.

In the graph 1600 shown in FIG. 16, particulate debris from a low particulating "clean" toggle clamp, such as any of the low particulating toggle clamps 200, 1300, 1400 and 1500, is compared to particulate debris from a CL-150-HTC-S clamp, a 305-UR clamp, a 2013-UR clamp, a CL-250-LVTC clamp, a CL-60-SPC-S clamp, a 205-SS clamp and a CL-200-LVTC clamp, such as by using particle microscopy. The particles were observed after 100 cycles of use and grouped in sizes from 5-15 microns, 15-25 microns, 25-50 microns, 100-150 microns, 150-200 microns, 200-400 microns and >400 microns. In each group, the clean clamp produced a considerably lower amount of particulate debris. For example, in a first group comprising 5-15 microns, the clean clamp produced fourteen particles as compared to 215 for the CL-150-HTC-S clamp, 27041 for the 305-UR clamp, 34215 for 2013-UR clamp, 62054 for the CL-250-LVTC clamp, 78063 for the CL-60-SPC-S clamp, 82151 for the 205-SS clamp and 172895 for the CL-200-LVTC clamp.

Modifications, additions, or omissions may be made to the systems, apparatuses, and methods described herein without departing from the scope of the invention. One or more aspects or elements for different embodiments may be combined or used separately. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

To aid the Patent Office, and any readers of any patent issued on this application in interpreting the claims appended hereto, applicants wish to note that they do not intend any of the appended claims or claim elements to invoke paragraph 6 of 35 U.S.C. Section 112 as it exists on the date of filing hereof unless the words "means for" or "step for" are explicitly used in the particular claim.

What is claimed is:

1. A toggle clamp comprising:
    a base configured to couple to a surface;
    an arm rotationally coupled to the base via a first bearing isolated rod, the arm comprising a clamping element;
    a handle rotationally coupled to the arm via a second bearing isolated rod, the handle comprising a revolving latching pin;
    a linkage rotationally coupled on a first end to the handle via a third bearing isolated rod and on a second end to the base via a fourth bearing isolated rod; and
    a secondary latch rotationally coupled to the base and configured to engage the revolving latching pin to inhibit movement of the handle and arm,
    wherein each of the bearing isolated rods comprises a rod coupled to one or more bearings, and wherein the bearing isolated rods are configured to enable the handle, the arm, and the linkage to rotate without a frictional sliding of any surface of the arm, the handle, the linkage, or the base.

2. The toggle clamp according to claim 1, wherein the clamping element comprises one of:
    a contact bolt;
    a spring-loaded tip;
    a contact disc; or
    a clamp roller.

3. The toggle clamp according to claim 1, wherein the clamping element includes a captive o-ring.

4. The toggle clamp according to claim 1, wherein the secondary latch is spring-loaded and configured to rotate within a limited arc and wherein the revolving latching pin is rotationally coupled to the handle via a bearing interface.

5. The toggle clamp according to claim 1, wherein the toggle clamp is configured to be normally closed, further comprising one or more springs configured to maintain the toggle clamp in a restrained position.

6. The toggle clamp according to claim 1, further comprising a hard stop configured to limit a forward clamping motion of the toggle clamp.

7. A toggle clamp comprising:
    a base configured to couple to a surface;
    an arm rotationally coupled to the base via a first bearing isolated rod, the arm comprising a clamping element;
    a handle rotationally coupled to the arm via a second bearing isolated rod, the handle comprising a revolving latching pin;
    a linkage rotationally coupled on a first end to the handle via a third bearing isolated rod and on a second end to the base via a fourth bearing isolated rod;
    a secondary latch rotationally coupled to the base and configured to engage the revolving latching pin to inhibit movement of the handle and arm; and
    a magnetic element configured to maintain the toggle clamp in an un-clamped position;
    wherein the handle, arm and linkage are configured to rotate without a frictional sliding of any surface of the arm, the handle, the linkage or the base.

8. A toggle clamp comprising:
    a base comprising a bottom surface, a first lateral edge, and a second lateral edge;
    an arm rotationally coupled to the base between the first lateral edge and the second lateral edge, the arm comprising a clamping element;
    a handle rotationally coupled to the arm; and
    a secondary latch rotationally coupled to the base between an interior surface of the first lateral edge and an interior surface of the second lateral edge, the secondary latch configured to inhibit motion of at least one of the arm or the handle,
    wherein the handle and the arm are configured to rotate without a frictional sliding of any surface of the arm, the handle, or the base with another surface of the arm, the handle, or the base.

9. The toggle clamp according to claim 8, wherein the clamping element comprises one of:
    a contact bolt;
    a spring-loaded tip;
    a contact disc; or
    a clamp roller.

10. The toggle clamp according to claim 8, wherein the clamping element includes a captive o-ring.

11. The toggle clamp according to claim 8, wherein the secondary latch is spring-loaded and configured to engage a revolving latching pin that is rotationally coupled to the handle via a bearing interface.

12. The toggle clamp according to claim 8, wherein the toggle clamp is configured to be normally closed, further comprising one or more springs configured to maintain the toggle clamp in a restrained position.

13. The toggle clamp according to claim 8, further comprising a hard stop configured to limit a forward clamping motion of the toggle clamp.

14. A toggle clamp comprising:
    a base;
    an arm rotationally coupled to the base, the arm comprising a clamping element;
    a handle rotationally coupled to the arm;
    a secondary latch configured to inhibit motion of at least one of the arm or the handle; and
    a magnetic element configured to maintain the toggle clamp in an un-clamped position;
    wherein the handle and the arm are configured to rotate without a frictional sliding of any surface of the arm, the handle, or the base with another surface of the arm, the handle, or the base.

15. A system comprising:
    a number of toggle clamps, wherein at least one toggle clamp comprises:
        a base;
        an arm rotationally coupled to the base, the arm comprising a clamping element;
        a handle rotationally coupled to the arm; and a secondary latch configured to inhibit motion of at least one of the arm or the handle, wherein surfaces of the handle and the arm are separated from each other and from surfaces of the base such that the handle and the arm are able to rotate without a frictional sliding of any of the surfaces of the arm, the handle, or the base with another surface of the arm, the handle, or the base.

16. The system according to claim 15, wherein the clamping element comprises one of:
   a contact bolt;
   a spring-loaded tip and a hard stop configured to limit a forward clamping motion of the toggle clamp;
   a contact disc; or
   a clamp roller.

17. The system according to claim 15, wherein the clamping element includes a captive o-ring.

18. The system according to claim 15, wherein the secondary latch is spring-loaded and configured to engage a revolving latching pin that is rotationally coupled to the handle via a bearing interface.

19. The system according to claim 15, wherein the at least one toggle clamp is configured to be normally closed and further comprises one or more springs configured to maintain the at least one toggle clamp in a restrained position.

20. A system comprising:
   a number of toggle clamps, wherein at least one toggle clamp comprises:
      a base;
      an arm rotationally coupled to the base, the arm comprising a clamping element;
      a handle rotationally coupled to the arm;
      a secondary latch configured to inhibit motion of at least one of the arm or the handle; and
      a magnetic element configured to maintain the toggle clamp in an un-clamped position;
   wherein the handle and the arm are configured to rotate without a frictional sliding of any surface of the arm, the handle, or the base with another surface of the arm, the handle, or the base.

* * * * *